United States Patent
Petersson et al.

(10) Patent No.: US 8,295,772 B2
(45) Date of Patent: Oct. 23, 2012

(54) DEVICE FOR IMPROVED ISOLATION CHARACTERISTICS IN A TELECOMMUNICATIONS SYSTEM

(75) Inventors: Sven Petersson, Sävedalen (SE); Henrik Asplund, Stockholm (SE); Jan-Erik Berg, Sollentuna (SE); Stefan Felter, Bromma (SE); Martin Johansson, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 810 days.

(21) Appl. No.: 12/307,660

(22) PCT Filed: Jul. 6, 2006

(86) PCT No.: PCT/EP2006/063962
§ 371 (c)(1),
(2), (4) Date: Jul. 6, 2006

(87) PCT Pub. No.: WO2008/003354
PCT Pub. Date: Jan. 6, 2009

(65) Prior Publication Data
US 2009/0197544 A1    Aug. 6, 2009

(51) Int. Cl.
*H04B 1/00*    (2006.01)
*H04B 15/00*    (2006.01)
(52) U.S. Cl. .................. 455/63.1; 455/67.11; 455/562.1
(58) Field of Classification Search .................. 455/63.1, 455/63.2, 67.11, 67.13, 67.16, 575.7, 562.1
See application file for complete search history.

(56) References Cited

U.S. PATENT DOCUMENTS
2003/0092402 A1    5/2003    Shapira et al.

FOREIGN PATENT DOCUMENTS
WO    WO 01/54230    7/2001
WO    WO 2004/015887    2/2004

OTHER PUBLICATIONS

International Search Report for PCT/EP2006/063962, mailed Mar. 27, 2007.
Shapira, J. et al., "A Novel Polarization Smart Antenna", VTC 2001, vol. 1 of 4, Conf. 53, (May 6-9, 2001), pp. 253-257.
Miller, S. et al., "Transmission Considerations for Polarization-Smart Antennas", VTC 2001, vol. 1 of 4, Conf. 53, (May 6-9, 2001), pp. 258-262.
English Translation of Chinese official action, Jun. 17, 2011, in corresponding Chinese Application No. 200680055247.7.

*Primary Examiner* — Lewis West
(74) *Attorney, Agent, or Firm* — Nixon & Vanderhye P.C.

(57) ABSTRACT

Apparatus in a wireless telecommunications system comprises at least a first antenna of a first polarization and a second antenna of a second polarization. The apparatus additionally comprises a receiver and a transmitter, and is intended for communication with at least one other device in the wireless telecommunications system. The apparatus is equipped with a polarization estimator for estimating the polarization state of a signal which is received from the one other device, and a polarization controller for adapting the polarization state of signals transmitted from the apparatus to the one other device on the basis of the estimate of the received signal.

19 Claims, 4 Drawing Sheets

DEVICE FOR IMPROVED ISOLATION CHARACTERISTICS IN A TELECOMMUNICATIONS SYSTEM

This application is the U.S. national phase of International Application No. PCT/EP2006/063962, filed 6 Jul. 2006, which designated the U.S., the entire contents of which is hereby incorporated by reference.

TECHNICAL FIELD

The present invention relates to an apparatus in a wireless telecommunications system, the apparatus being intended for communication with at least one other device in the wireless telecommunications system. The apparatus comprises a receiver and a transmitter, and at least a first antenna of a first polarization and a second antenna of a second polarization.

BACKGROUND

In current systems for wireless telecommunications, such as cellular telephony, the transmitters of the system, particularly those in the base stations, may be equipped with dual polarized antennas. Usually, this is in order to utilize the polarization of the radio channel for polarization reception diversity, as a complement to, or instead of, spatial diversity in the base station.

Transmission is normally carried out on one of the antennas of the device, i.e. in this example the base station, but polarization transmission diversity where both antennas are used, also exists. In some cases, both antennas in the base station are used for transmission, with half (or some other proportion) of the signals being transmitted via one antenna, and the rest via the other. One purpose of such a transmission arrangement is to reduce combining losses which may occur when radio channels are combined in the base station after power amplification.

Transmission diversity schemes such as the closed loop TX diversity in WCDMA can be seen as beam steering based on feedback when antennas with identical, or nearly identical, polarization are used. When antennas with orthogonal, or nearly orthogonal, polarization are used, closed loop TX diversity can instead be seen as a polarization adaptation. Instead of feedback information, uplink measurements can be used for adaptation of the downlink transmission.

For example, in the case of beam steering, using an array antenna with multiple closely spaced identical radiating elements, downlink beam forming can be controlled based on uplink direction-of-arrival estimates.

SUMMARY

Information regarding the polarization properties of the radio channel, including those of the receiving antennas, is used to improve the performance of the radio connection.

This purpose is achieved by an apparatus in a wireless telecommunications system, which comprises at least a first antenna of a first polarization and a second antenna of a second polarization, as well as a receiver block and a transmitter block.

The apparatus is intended for communication with at least one other device in the wireless telecommunications system, and is equipped with means for estimating the polarization state of a signal which is received from the one other device.

The apparatus additionally comprises control means for adapting the polarization state of signals transmitted from the apparatus to the one other device on the basis of said measurement of the received signal and on available auxiliary information such as information extracted from control signalling and system performance measures.

Thus, by means of the apparatus, the polarization properties of the radio channel may be utilized in order to improve the transmission quality of the radio connection.

DETAILED DESCRIPTION

The following description is explained with reference to a cellular telephony system, as a consequence of which the communication which will be described will be that between a radio base station, RBS, and a terminal, UE (user equipment), the RBS utilizing two antenna ports corresponding to two antennas with different polarizations.

However, those skilled in the field will realize that this is only an example; the technology described can be applied to a vast number of communication applications, for example communication between an RBS and a repeater or relay node. Further, more than two antennas with different polarizations may be utilized at one or both ends of the communication system. Also, it should be pointed out that either end of the communication, i.e. either the RBS and/or the UE can be equipped with a device as described. Naturally, both ends of the communication can also be equipped with such a device.

With renewed reference to the cellular telephony system in the examples which will be used, the term Up Link (UL) will be used to refer to the communication from the UE to the RBS, and the term Down Link, (DL) will be used to refer to the communication from the RBS to the UE.

Unless otherwise noted, the UE is assumed to use identical polarization states for reception and transmission. In general, however, arbitrary polarization states may be used by the UE, since auxiliary polarization control information, such as DL power control commands, is available to the RBS.

Although described in detail for a wireless communication link between two entities, an RBS and a UE, it should be understood that the technology also applies to systems with an arbitrary number of communication links between an RBS and a UE, for example as in a MIMO system, in which the technology may be applied to for example each stream of information.

Figure 1:
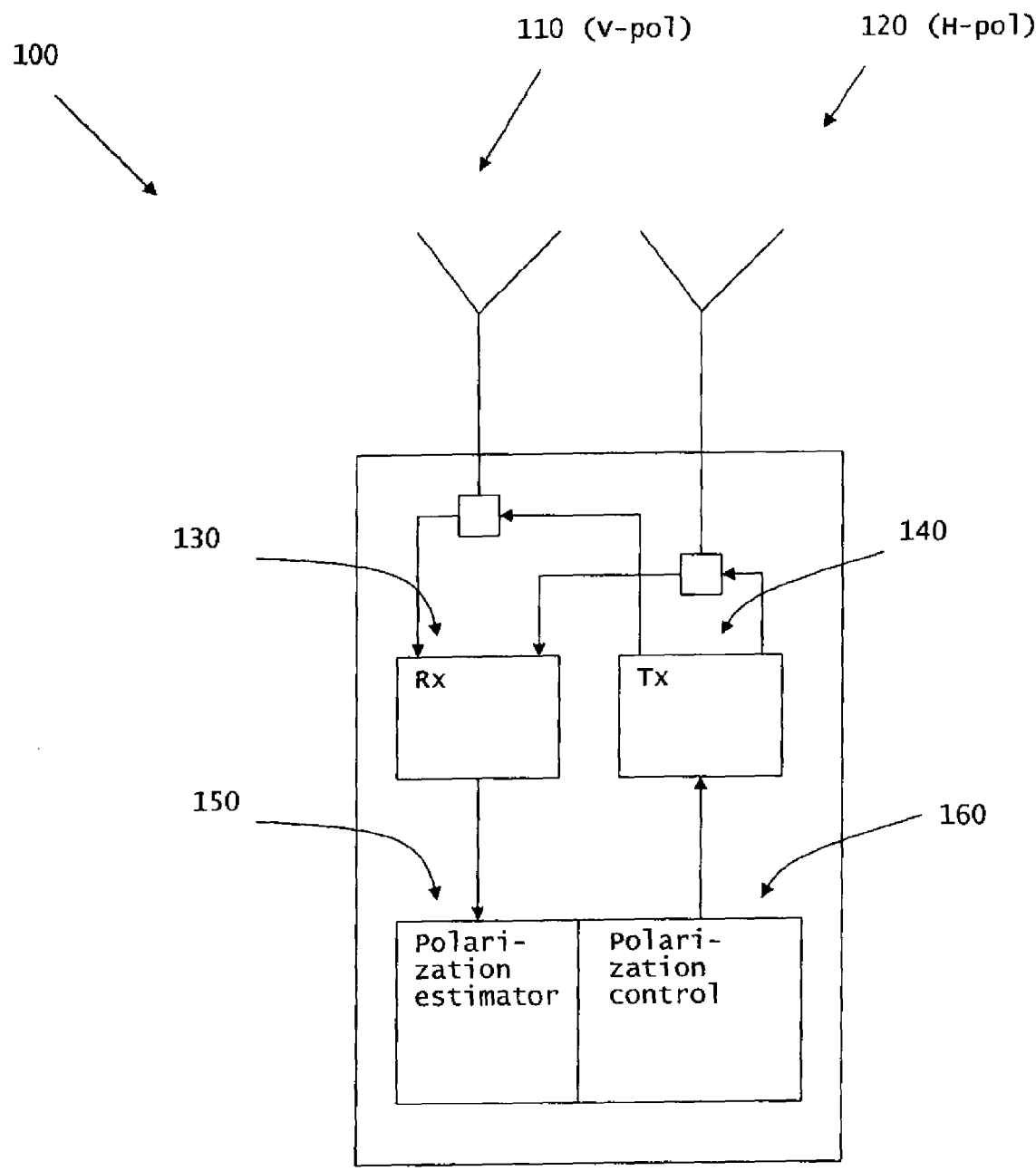
FIG. 1 shows a polarization controller.

FIG. 1 shows a schematic block diagram of an apparatus 100 where it is assumed that the apparatus 100 is equipped with at least a first antenna 110 of a first polarization, and a second antenna 120 of a second polarization, the antennas 110 and 120 typically being implemented as a dual polarized antenna. Suitably, these two polarizations are horizontal and vertical, respectively, as shown in FIG. 1, although it is possible to use other combinations of polarizations, which need not be orthogonal with respect to each other but must not be identical.

In addition to said antennas 110, 120, the apparatus additionally comprises a receiver block 130 and a transmitter block 140, each block containing one or more radio chains. The apparatus 100 is intended for communication with at least one other device in a wireless telecommunications system, such as a cellular telephony system.

The apparatus 100 is also equipped with means 150 for measuring the polarization state of a signal which is received from said one other device, and with means 160 for adapting or controlling the polarization state of signals transmitted from the apparatus to the one other device on the basis of said measurement of the received signal. Said measuring and polarization control means 150, 160 can be one and the same functional block in the apparatus 100, as shown in FIG. 1, or they can be separate function blocks or separate physical entities in the apparatus 100.

The function of the measuring 150 and polarization control means 160 is to adapt the polarization of the signals which are to be transmitted from the apparatus 100 by the transmitter 140 to a polarization state which will improve the communications quality.

The adaptation is carried out by means of applying weights or weight factors to the individual signals which are transmitted by the transmitter 130 from the first and second antennas. The weight factors can be pure phase factors, or they can comprise an amplitude factor as well, to change the relative signal amplitudes. Thus, replicas of a signal which is to be transmitted by the transmitter 140 of the device 100 by means of the antennas of the first 110 and second 120 polarizations will in the polarization control means 160 be given different phase and amplitude weights before it reaches the antennas, which will cause the signal transmitted by the antennas to have a resulting desired total polarization, for example a polarization which coincides with the polarization measured on the UL.

The weights used for the transmitted signals are adapted to utilize the system in a way that is optimal in a desired sense, for example with respect to output power, and the polarization control may use different types of inputs. In the case described above, where the only input is the polarization state on the UL-signal, the goal of the polarization control is to optimize the polarization for DL transmission.

If and when further inputs are available, as will be described in more detail in the following, the polarization control process for the DL transmission may be based on criteria other than replicating the UL polarization state, for example minimization of the DL transmission power for each UE individually, or per cell in a cellular telephony system. In such cases, the polarization state on the DL will not necessarily be identical to the one on the UL.

Figure 2:
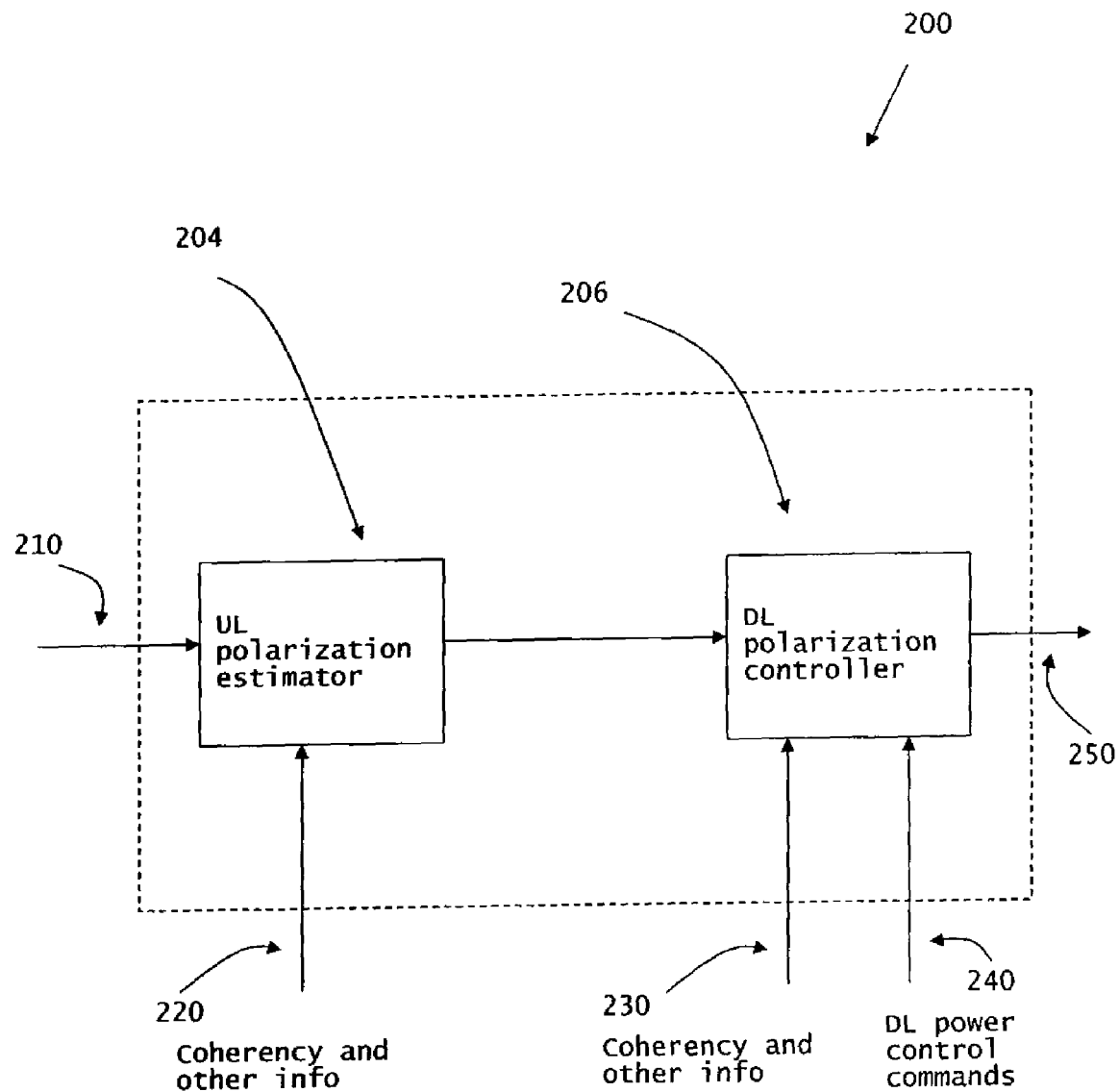
FIG. 2 shows a generic polarization controller.

FIG. 2 shows a generic polarization controller 200 for use in a transmitter, which can be used to obtain the functions of the units 150 and 160 described previously and shown in FIG. 1. The polarization controller 200 delivers as its output 250 the mentioned weight factor or factors to be used on the signals which are to be transmitted. The polarization controller 200 includes two main functional blocks. In a first block 204, the UL polarization estimator, where the UL polarization state is estimated or measured, and in a second block 206, DL polarization controller, where the weights for DL transmission are calculated.

One parameter for use by the polarization controller 200 is the mentioned UL measurements, which are shown as an input 210 to the controller unit 200.

Apart from the UL channel measurements 210, other parameters for input to the polarization controller 200 can be:
UL base station coherency information, such as phase and amplitude properties of the RBS on reception. This is an input 220 to the UL polarization estimator 204.
DL base station coherency information, in other words such as phase and amplitude properties of the RBS on transmission. This is an input 230 to the DL polarization controller 206.
DL power control commands, i.e. power commands from the one other device to the RBS. This is an input 240 to the DL polarization controller 206.
Information regarding the antenna configuration at the UE. Examples of such information can be whether the same antenna is used for reception and transmission and also the number of antennas used for reception if more than one.

In order to find the UL and DL base station coherency information, measurements are suitably carried out by a calibration function in the RBS.

All of the parameters listed above need to be taken into account by the polarization controller 200 of FIG. 2 in order to achieve a good polarization adaptation of the transmitted signal.

A number of cases can be discerned when it comes to the information which is available to the polarization controller 200, and the steps to be taken by the controller as a consequence of this information. These cases will be described in the following, using the definitions given below:

Channel: This term is in the following taken to mean the characteristics of the propagation paths between the apparatus and the one other device with which it communicates.

Correlated channel: The amplitude and phase values of the polarization components are correlated over a sufficiently long time and over a sufficiently wide frequency band, so that channel measurements performed on the UL are valid for use on the DL.

Power-correlated channel: The amplitude relation between the polarizations is correlated over a sufficiently long time and over a sufficiently wide frequency band, so that channel measurements performed on the UL are valid for use on the DL.

Non-correlated channel: The channel polarization state measurements performed on the UL are not valid for use on the DL.

Coherent base station: Amplitude, phase and time delay characteristics for the radio chains used for the UL are sufficiently known. Amplitude, phase and time delay characteristics for the radio chains used for the DL are sufficiently known.

Amplitude coherent base station: Amplitude and time delay characteristics for the radio chains used for the UL are sufficiently known. Amplitude and time delay characteristics for the radio chains used for the DL are sufficiently known.

Phase coherent base station: Phase and time delay characteristics for the radio chains used for the UL are sufficiently known. Phase and time delay characteristics for the radio chains used for the DL are sufficiently known.

Non-coherent base station: Neither amplitude nor phase characteristics for the radio chains used for the UL are sufficiently known. Neither amplitude nor phase characteristics for the radio chains used for the DL are sufficiently known.

Various example embodiments are given below. These cases are also briefly shown in the flowchart 400 of FIG. 4, which is referred to below.

Case 1, Correlated Channel, Coherent Base Station

Figure 4:
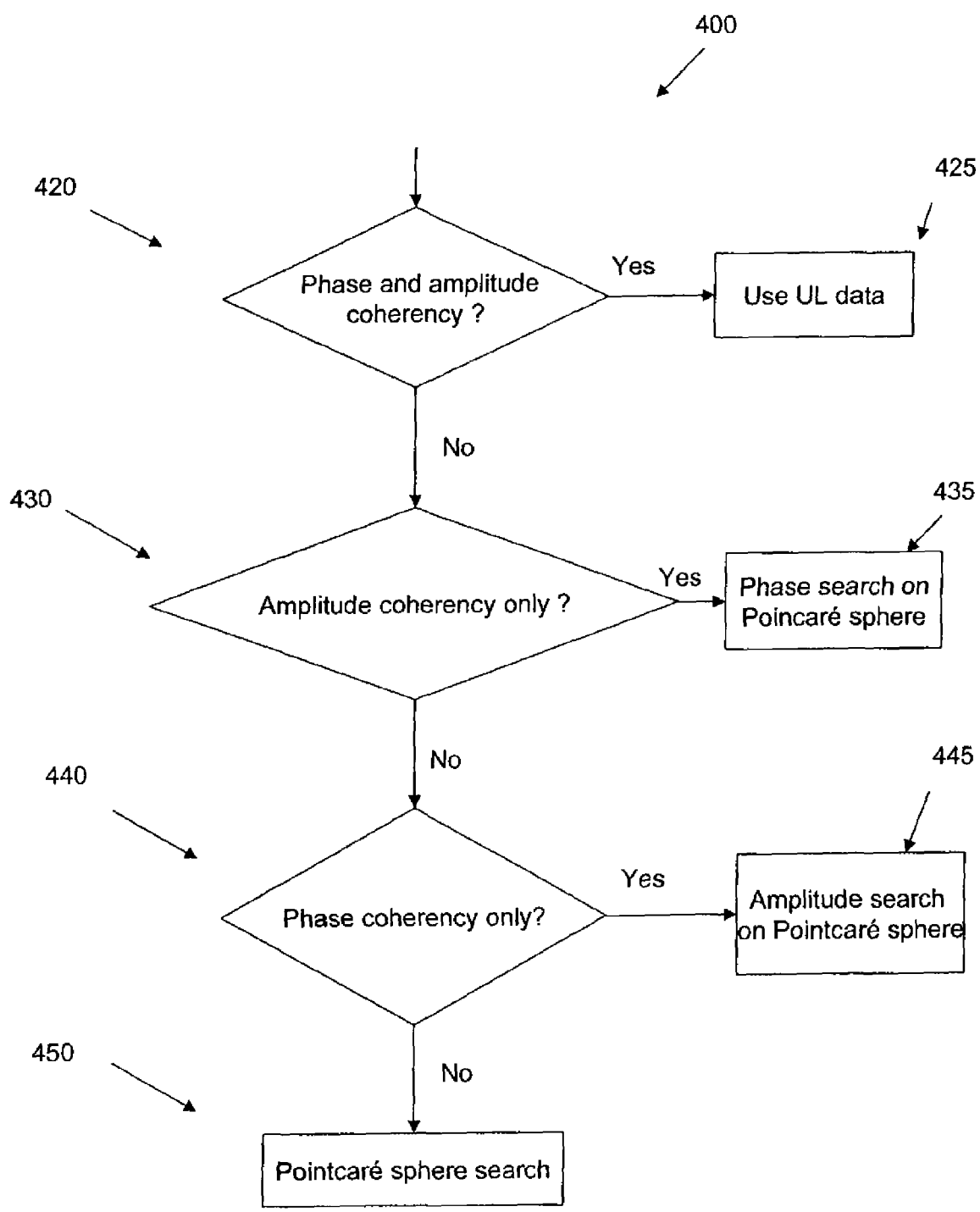

In this case, which corresponds to block 425 of FIG. 4, the polarization state of the received signal is observed by the polarization estimator 204 and input to DL polarization controller 206. Both the polarization estimator 204 and the DL polarization controller 206 take the known RBS amplitude, phase, and time delay characteristics into account.

The DL polarization controller 206 of FIG. 2 can have other inputs than UL channel measurements, such as DL power control commands.

Case 2, Correlated Channel, Amplitude Coherent Base Station.

In this case, which corresponds to block 435 of FIG. 4, due to the unknown phase relations between the polarizations, only the amplitude components in the polarization state observed by the polarization estimator 204 can be used by the DL polarization controller 206. Both the polarization estimator 204 and the DL polarization controller 206 take the known RBS amplitude and time delay characteristics into account.

Since the phase characteristics of the base station are not known, the DL polarization controller 206 must have other inputs than UL channel measurements, such as DL power control commands etc, in order to support a search for the phase values which will produce the best polarization state, according to desired criteria such as transmit power, on DL.

The relative phase values can be found by a (N−1) dimensional search, where N is the number of polarizations used on both UL and DL, i.e. in the present example N=2. In other words, the device will apply a number of different phase shifts between the two polarizations used to transmit the signals, and will observe for example the DL power control commands from the UE. The DL polarization controller 206 monitors the system performance and adjusts the phase shifts to adapt to time-variations in the propagation channel.

Figure 3:
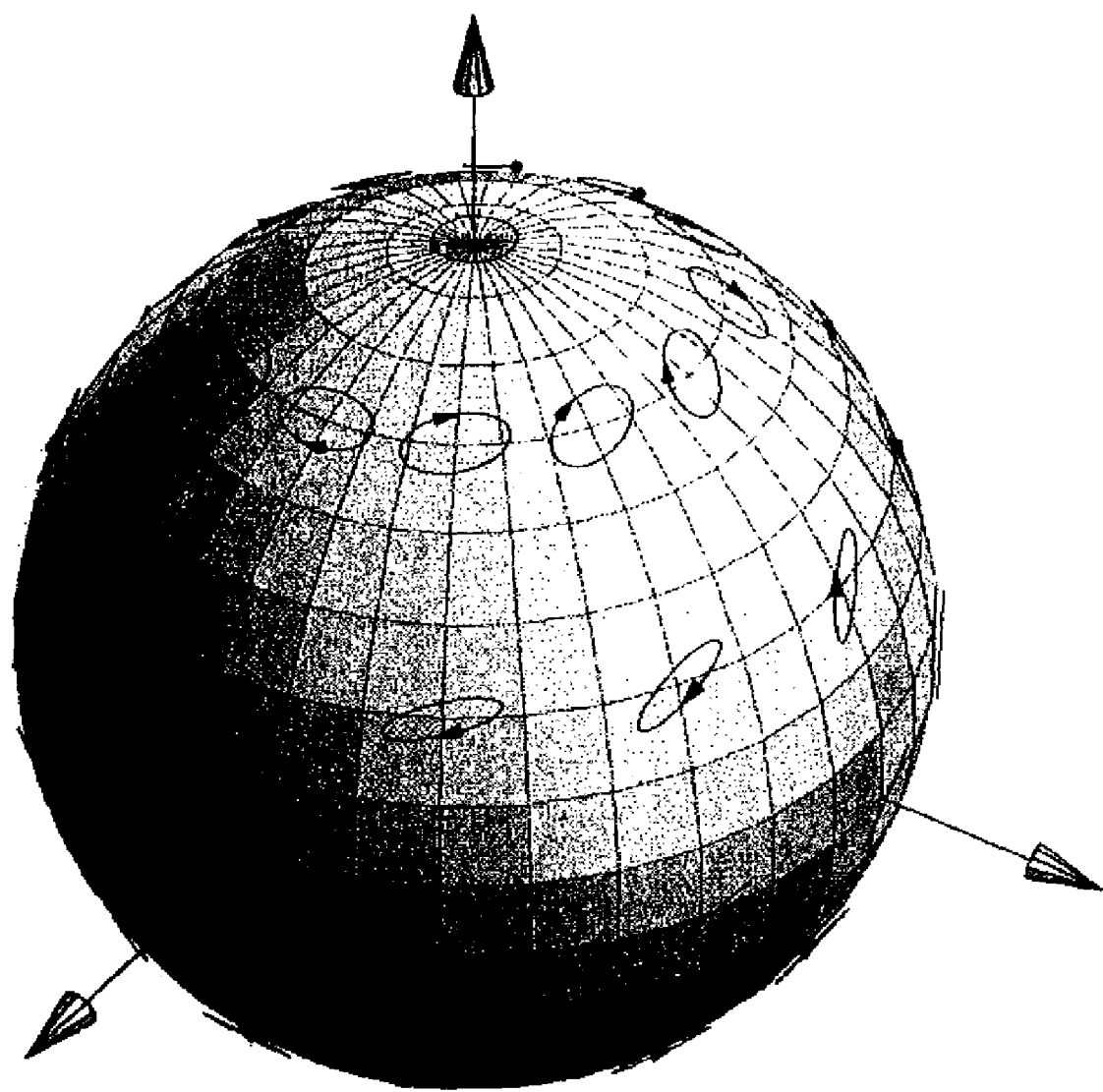
FIG. 3 shows a so called Poincaré sphere and
FIG. 4 shows a schematic flowchart.

In the case of a dual polarized antenna having orthogonal polarizations, the adaptation process can be seen as corresponding to a search for the best polarization along a line, corresponding to constant relative amplitude, on the surface of a sphere, the so called Poincaré sphere shown in FIG. 3. For fine-tuning, the search for the best polarization state may also encompass different values on the amplitude relations between the signals in the respective polarizations.

Case 3, Correlated Channel, Phase Coherent Base Station

In this case, which corresponds to block 445 of FIG. 4, due to the unknown amplitude relations between the polarizations, only the phase components in the polarization state observed on the UL by the polarization estimator 204 can be used by the DL polarization controller 206. Both the polarization estimator 204 and the DL polarization controller 206 take the known RBS phase and time characteristics into account.

Since the amplitude characteristics of the base station are not known, the DL polarization controller 206 must have other inputs than UL channel measurements, such as DL power control commands etc, in order to support a search for the amplitude values which will produce the best polarization state, according to desired criteria such as transmit power, on DL.

The relative amplitude values can be found by a (N−1)-dimensional search where N is the number of polarizations used on both UL and DL, i.e. in the present example, N=2. In other words, the device will apply a number of different amplitude relations between the two polarizations used to transmit the signals, and will observe for example the DL power control commands from the UE. The DL polarization controller 206 monitors the system performance and adjusts the amplitude relations to adapt to time-variations in the propagation channel.

In the case of a dual polarized antenna having orthogonal polarizations, the adaptation process can be seen as corresponding to a search for the best polarization along a line, corresponding to constant relative phase, on the surface of a sphere, the so called Poincaré sphere shown in FIG. 3. For fine-tuning, the search for the best polarization state may also encompass different values on the phase differences between the signals in the respective polarizations.

Case 4, Correlated Channel, Non-Coherent Base Station

In this case, the base-station is neither amplitude nor phase coherent, meaning that the polarization state observed by the polarization estimator 204 will typically not be a correct estimate of the actual polarization state. However, the estimator still provides useful information such as arbitrary order derivatives of the estimator observables. Thus, even though the base station is non coherent, channel reciprocity can still be exploited.

The polarization adaptation process encompasses a search, block 450, for polarization weights that are optimal in a desired sense, for example with respect to output power, the search being performed in a multidimensional space, i.e. with more than one parameter to be varied. The adaptation process is supported by for example DL power control commands from the UE and derivatives of observables from the polarization estimator 204, to continuously strive for the best possible DL weights.

In the case of a dual polarized antenna having orthogonal polarizations, the adaptation process can be seen as corresponding to a search for the best polarization along two orthogonal directions on the surface of a sphere, the so called Poincaré sphere shown in FIG. 3. In other words, all relevant combinations of two orthogonally polarized signals will be tried in this case, The size of the search area on the Poincaré sphere, as well as the DL polarization controller 206 update rate, are both based on for example DL power control commands from the UE and derivatives of observables from the polarization estimator 204.

Case 5, a Simplified Case

A general observation can be made: The polarization state of radio waves transmitted with horizontal or vertical polarization, and only with these polarizations, is to a large extent maintained over many propagation channels. This leads to a simplified principle for time-varying polarization control: Perform DL transmission using either vertical or horizontal polarization, based on for example which of these polarizations has the highest mean power on the UL.

This case is applicable for example when the channel is un-correlated between UL and DL or when there is a desire to have a low-complexity solution.

Even in this simplified case, a polarization controller 200 as shown in FIG. 2 should be used. The adaptation process may use different types of inputs. For example, if the input is only which of the polarization states (horizontal or vertical), has the highest power on the UL, the goal will typically be to use that polarization state for the DL transmission.

In a coherent base station, the simplified principle for time-varying polarization control may be used in the following way: For arbitrarily dual polarized antennas, transform the received UL signals into a vertical and a horizontal polarization state, and estimate the average received power in the respective states. Select the polarization (horizontal or vertical) with the highest average UL power for DL transmission.

In a base station which is only amplitude coherent, the simplified principle for time-varying polarization control may instead be used in the following way: For dual polarized antennas with vertical and horizontal polarization states, estimate the average received power in the respective states. Select the polarization with the highest average UL power for DL transmission.

Basis for Polarization Control

If further inputs are available, the polarization adaptation process for the DL transmission may be based on criteria other than minimization of the DL transmission power on a UE-by-UE basis or per cell. Other criteria can for example be based on SINR, Signal to Interference Noise Ratio.

The invention claimed is:

1. An apparatus for a base station in a wireless telecommunications system for communication with a user equipment (UE), the base station apparatus comprising:
   a first antenna of a first polarization;
   a second antenna of a second polarization;
   a receiver;
   a transmitter;
   means for estimating the polarization state of an uplink signal which is received from the UE; and
   means for adapting the polarization state of a downlink signal transmitted from the base station to the UE based on the estimated polarization state of the uplink signal,
   wherein the means for adapting the polarization state of the downlink signal includes means for determining parameters relating to a coherency of the base station and an antenna configuration of the UE that specifies a number of antennas being used by the UE to communicate with the base station, that number being greater than one, and
   wherein the means for adapting the polarization state of the downlink signal is configured to adapt the polarization state of the downlink signal based on the determined parameters.

2. The device of claim 1, wherein the means for adapting the polarization state of the downlink signal includes means for searching for and identifying phase and/or amplitude characteristics of the base station that produce an optimal polarization state for the transmitted downlink signal, and wherein the means for adapting the polarization state of the downlink signal is configured to adapt the polarization state of the downlink signal based on the identified phase and/or amplitude characteristics.

3. The device of claim 1, wherein the parameters include information regarding the correlation of the channel.

4. The device of claim 1, wherein the means for adapting the polarization state of the downlink signal is configured to adapt the polarization state of the downlink signal by applying weight factors to replicas of the downlink signal to be transmitted from the first and second antennas, respectively.

5. The device of claim 1, wherein the means for adapting the polarization state of the downlink signal is configured receive and to adapt the polarization state of the downlink signal inputs based on power control commands from the UE.

6. A method for use in an apparatus that includes a first antenna with a first polarization and a second antenna with a second polarization, a receiver, and a transmitter, the method being used when the apparatus communicates with at least one other device in a wireless telecommunications system, where the method comprises the following steps:
   estimating the polarization state of a signal received in the apparatus from the one other device, and
   adapting the polarization state of a signal transmitted from the apparatus to the one other device based on the estimated polarization state of the received signal,
   determining phase and/or amplitude characteristics of the apparatus that produce an optimal polarization state for the transmitted signal;
   determining one or more parameters including an antenna configuration of the one other device that specifies a number of antennas being used by the UE to communicate with the base station, that number being greater than one; and
   further adapting the polarization state of the transmitted signal based on the determined parameters including the antenna configuration of the one other device and the determined phase and/or amplitude characteristics.

7. The method of claim 6, wherein the determined parameters further include information regarding a correlation of a channel between the apparatus and the one other device.

8. The method of claim 6, wherein adapting the polarization state of the transmitted signal includes applying weight factors to replicas the signal to be transmitted from the first and second antennas of the apparatus, respectively.

9. The method of claim 6, wherein, if the phase characteristics of the apparatus are not known, then the method further comprises performing a search for phase values that will produce the optimal polarization state for the transmitted signal.

10. The method of claim 6, wherein, if the amplitude characteristics of the apparatus are not known, then the method further comprises performing a search for amplitude values that will produce an optimal polarization state for the transmitted signal.

11. The method of claim 6, wherein, if neither the amplitude nor the phase characteristics of the apparatus are known, then the method further comprises performing a search for a combination of amplitude and phase values that will produce an optimal polarization state for the transmitted signal.

12. The method of 11, wherein the search is performed using downlink power control commands.

13. The method of claim 6, wherein adapting the polarization state of the transmitted signal includes estimating an average received power in the first and second antennas, and selecting the antenna with the highest average power for transmission by the apparatus.

14. An apparatus for communicating with at least one other device in a wireless telecommunications system, the apparatus comprising:
   a first antenna with a first polarization;
   a second antenna with a second polarization;
   a receiver;
   a transmitter;
   a controller configured to:
      estimate the polarization state of a signal received in the apparatus from the one other device,
      determine an antenna configuration of the one other device that specifies a number of antennas being used by the UE to communicate with the base station, that number being greater than one,
      determine phase and/or amplitude characteristics of the apparatus that produce an optimal polarization state for the transmitted signal; and
      further adapt the polarization state of the transmitted signal based on the estimated polarization state of the received signal, the determined antenna configuration of the one other device, and the determined phase and/or amplitude characteristics.

15. The method of claim 14, wherein the controller is configured to apply weight factors to replicas the signal to be transmitted from the first and second antennas of the apparatus, respectively.

16. The method of claim 14, wherein, if the phase characteristics of the apparatus are not known, then the controller is configured to perform a search for phase values that will produce the optimal polarization state for the transmitted signal.

17. The method of claim 16, wherein, if the amplitude characteristics of the apparatus are not known, then the controller is configured to perform a search for amplitude values that will produce an optimal polarization state for the transmitted signal.

18. The method of 17, wherein the controller is configured to search using downlink power control commands.

19. The method of claim 14, wherein the controller is configured to estimate an average received power in the first and second antennas, and select the antenna with the highest average power for transmission by the apparatus.

* * * * *

UNITED STATES PATENT AND TRADEMARK OFFICE
CERTIFICATE OF CORRECTION

PATENT NO. : 8,295,772 B2  
APPLICATION NO. : 12/307660  
DATED : October 23, 2012  
INVENTOR(S) : Petersson et al.

Page 1 of 1

It is certified that error appears in the above-identified patent and that said Letters Patent is hereby corrected as shown below:

In the Specification

Column 2, Line 12, delete "sphere and" and insert -- sphere, and --, therefor.

In the Claims

Column 8, Line 24, in Claim 12, delete "of 11," and insert -- of claim 11, --, therefor.

Column 9, Line 1, in Claim 18, delete "of 17," and insert -- of claim 17, --, therefor.

Signed and Sealed this
Eighteenth Day of March, 2014

Michelle K. Lee
*Deputy Director of the United States Patent and Trademark Office*